United States Patent [19]

Hayakawa

[11] Patent Number: 5,708,875
[45] Date of Patent: Jan. 13, 1998

[54] CAMERA HAVING ELECTRONIC FLASH EQUIPMENT

[75] Inventor: Masahiro Hayakawa, Tokyo, Japan

[73] Assignee: Asahi Kogaku Kogyo Kabushiki Kaisha, Tokyo, Japan

[21] Appl. No.: 647,315

[22] Filed: May 9, 1996

[30] Foreign Application Priority Data

May 11, 1995 [JP] Japan .................. 7-137137

[51] Int. Cl.⁶ .................................. G03B 15/03
[52] U.S. Cl. .................................. 396/176; 396/178
[58] Field of Search .................. 396/155, 176, 396/177, 178

[56] References Cited

U.S. PATENT DOCUMENTS

| | | | |
|---|---|---|---|
| 4,166,680 | 9/1979 | Maitani | 396/178 |
| 4,261,658 | 4/1981 | Uchiyama et al. | 396/178 |
| 4,319,818 | 3/1982 | Sawara | 396/201 |
| 4,331,405 | 5/1982 | Yamamoto | 396/177 |
| 4,847,647 | 7/1989 | Ueda | 396/62 |
| 4,855,771 | 8/1989 | Alligood et al. | 396/178 |
| 4,916,475 | 4/1990 | Hori | 356/62 |
| 5,005,032 | 4/1991 | Burnham | 396/178 |
| 5,028,949 | 7/1991 | Kawano | 396/106 |
| 5,036,345 | 7/1991 | Kawano | 396/113 |
| 5,208,622 | 5/1993 | Kawano | 396/424 |
| 5,276,474 | 1/1994 | Dassero | 396/178 |

FOREIGN PATENT DOCUMENTS

| | | |
|---|---|---|
| 54-50324 | 4/1979 | Japan . |
| 61-140337 | 8/1986 | Japan . |
| 64-56427 | 3/1989 | Japan . |
| 64-57249 | 3/1989 | Japan . |

*Primary Examiner*—Eddie C. Lee
*Attorney, Agent, or Firm*—Greenblum & Bernstein P.L.C.

[57] ABSTRACT

A camera having an electronic flash equipment includes a body case having a generally rectangular shape in a front elevational view. A photographing lens is provided near the center of a front surface of the body case. A strobe mounting arm is pivoted, at a base end thereof, to an upper portion of the body case, to be rotatable between inoperative and operative positions. When the strobe mounting arm is in the inoperative position the strobe mounting arm extends along and on the body case. When the strobe mounting arm is in the operative position, a front end portion of the strobe mounting arm projects outward from a lateral edge of the body case adjacent to the pivotal connection of the body case to the strobe mounting arm. The strobe mounting arm is provided on the front end portion with a strobe light emitter which faces toward a subject to be photographed when the strobe mounting arm is in the operative position.

13 Claims, 2 Drawing Sheets

CAMERA HAVING ELECTRONIC FLASH EQUIPMENT

BACKGROUND OF THE INVENTION

1. Field of the Invention

The present invention relates to a camera having electronic flash equipment attached thereto.

2. Description of the Related Art

Recently compact cameras have been provided with electronic flash (strobe) equipment incorporated therein for the purpose of photographing a subject in a location having an insufficient quantity of light.

As cameras have been miniaturized, the distance between the optical axis of a photographing lens and the optical axis of a built-in strobe (strobe light emitter) also been reduced. However, if the optical axis of the photographing lens is located close to the optical axis of the strobe, a red-eye phenomenon tends to occur in which the pupils of the eyes of a person (subject) to be photographed, whose line of sight is directed towards the photographing lens, become red on a color picture when a strobe is used.

To prevent the red-eye phenomenon from occurring, it is necessary to increase the distance between the optical axes of the photographing lens and the strobe, i.e., increase the inter-axis distance.

In a camera having a pop-up mechanism which ejects the strobe light emitter upward or laterally from the camera body (body case) upon strobe photographing, in order to increase the distance between the optical axes (inter-axis distance), attempts have been made to increase the length of protrusion of the strobe light emitter from the camera body in the ejected position. However, the inter-axis distance thus increased is still insufficient to completely prevent the occurrence of the red-eye phenomenon, particularly in smaller cameras.

To this end, a swingable protection cover has been proposed, which covers the photographing lens and which is rotatably connected at an upper end thereof to the camera body case, for example, in Japanese Unexamined Utility Model Publication No. 61-140337. In this proposal, the strobe light emitter is attached to a rear surface of a lower end of the protection cover, so that when the protection cover is popped-up upon strobe photographing, the distance between the axes of the photographing lens and the strobe light emitter can be increased.

However, in this proposal, since the inter-axis distance is approximately one and one-half times the size of the camera body in the vertical direction at most, it is impossible to realize an inter-axis distance large enough to prevent the red-eye phenomenon from occurring, particularly in small compact cameras.

Moreover, with regards to the illumination angle of a subject, it is preferable that the subject is illuminated with light emitted from a position located laterally and slightly above the camera. In the camera system disclosed in Japanese Unexamined Utility Model Publication No. 61-140337, the strobe light emitter is located directly above the photographing lens, thus resulting in ineffective lighting.

SUMMARY OF THE INVENTION

It is an object of the present invention to provide a small camera having an electronic flash equipment, in which the distance between the axes of the photographing lens and the strobe is large enough to prevent an occurrence of the red-eye phenomenon, and the position of the strobe light emitter with respect to the camera body is such that a sufficient quantity of illumination light is effectively obtained.

To achieve the object mentioned above, according to the present invention, there is provided a camera having an electronic flash equipment, including a body case having a generally rectangular shape in a front elevational view. A photographing lens is provided on a front surface of the body case in the vicinity of the center thereof. The improvement consists of a strobe mounting arm being pivoted, at a base end thereof, to an upper portion of the body case, so as to be movable through approximately 180 degrees between a lower inoperative position and an upper operative position. When in the inoperative position, the strobe mounting arm extends along, and on, the body case. When in the operative position a front end portion of the strobe mounting arm projects outward from a lateral edge of the body case adjacent to the pivotal connection of the body case to the strobe mounting arm. The strobe mounting arm is provided on the front end portion thereof with a strobe light emitter which, when in the operative position, faces toward a subject to be photographed.

The body case is preferably provided at one end of the front surface thereof with a bulged grip portion. When in the inoperative position, the strobe mounting arm is located between the photographing lens and the bulged grip portion.

Preferably, the bulged grip portion is provided with a front surface which is substantially continuous with the front surface of the strobe mounting arm, when the strobe mounting arm is in the inoperative position.

The body case can be provided on the front surface thereof with a recess in which the strobe mounting arm is fitted when in the inoperative position.

In a preferred embodiment, the front surface of the body case is substantially flush with the front surface of the strobe mounting arm when in the inoperative position.

A pivot axis, about which the strobe mounting arm is rotatable with respect to the body case, is preferably inclined with respect to a horizontal within a plane substantially perpendicular to an optical axis of the photographing lens, so that a portion of the pivot axis nearest to the photographing lens is higher than a portion thereof adjacent to a lateral end of the body case.

The inclination angle of the pivot axis with respect to the horizontal is preferably approximately 45°.

The strobe mounting arm can be provided therein with a strobe capacitor, a charging circuit, and a trigger circuit.

In another aspect of the present invention a camera is provided including a body case having a front surface on which a photographing lens is provided in substantially a center thereof. A pivot axis, provided on an upper portion of the body case, is inclined with respect to a horizontal, so that an inner portion of the pivot axis nearest to the photographing lens is higher than an outer portion of the pivot axis away from the photographing lens. A strobe mounting arm, pivoted at a base end thereof to the pivot axis, has a strobe light emitter at a free end therof, and is movable between inoperative and operative positions. When in the operative position, the strobe mounting arm is entirely within a contour of the body case in a front elevational view, and when in an operative position the strobe mounting arm projects outwardly from the body case.

The present disclosure relates to subject matter contained in Japanese Patent Application No. 7-137137 (filed on May 11, 1995) which is expressly incorporated herein by reference in its entirety.

BRIEF DESCRIPTION OF THE DRAWINGS

The invention will be described below in detail with reference to the accompanying drawings, in which like reference numerals indicate similar parts, and wherein.

DESCRIPTION OF THE PREFERRED EMBODIMENTS

Figure 1:
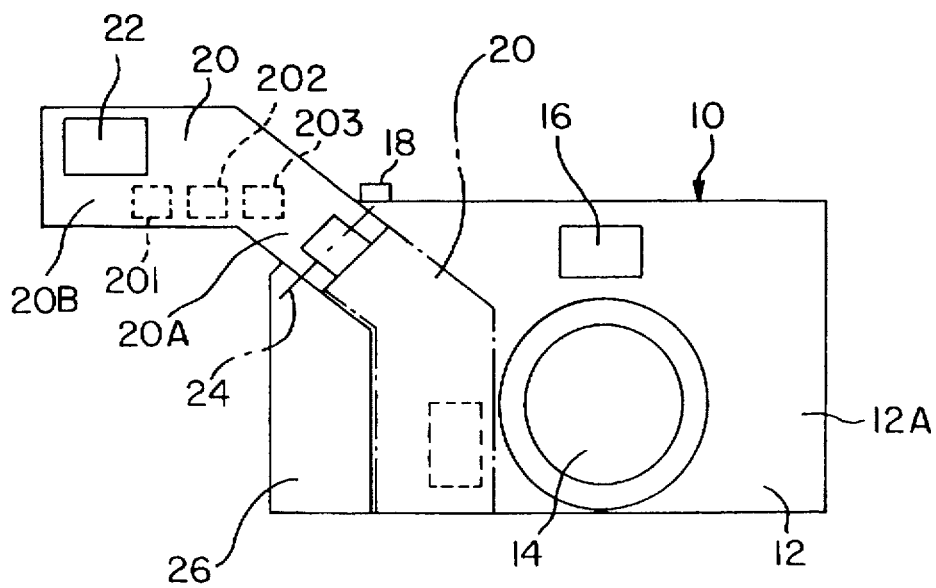
FIG. 1 is a front elevational view of a camera having electronic flash equipment, according to a first embodiment of the present invention.
Figure 2:
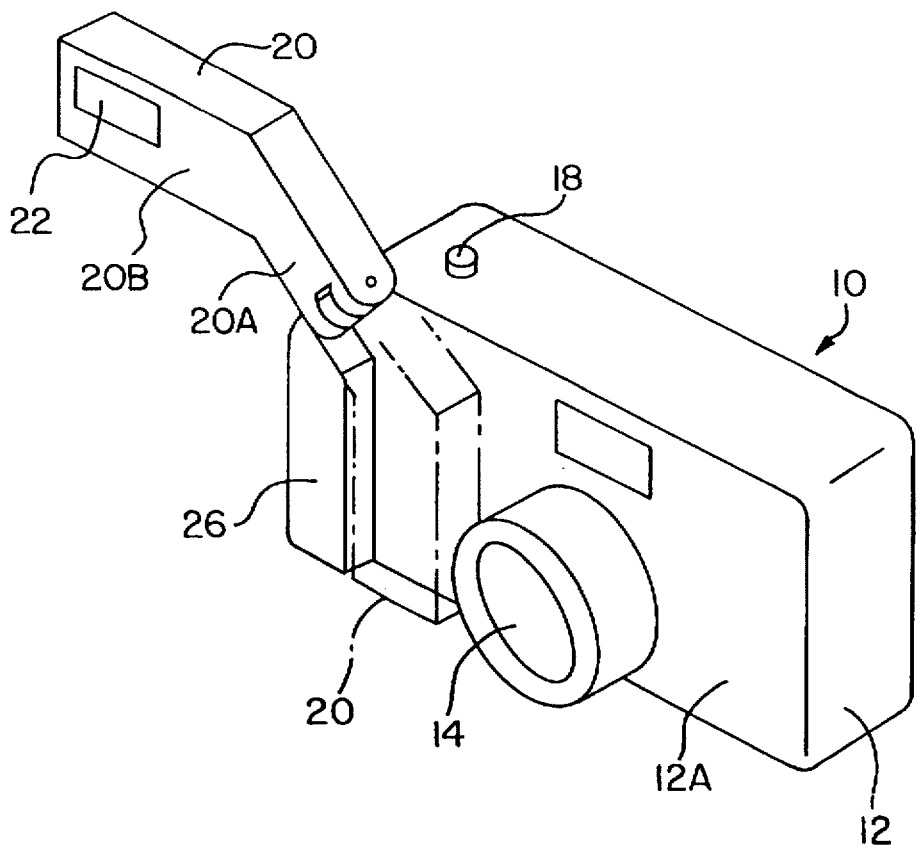
FIG. 2 is a perspective view of the camera shown in FIG. 1.

FIGS. 1 and 2 show a first embodiment of the present invention.

In FIGS. 1 and 2, a camera 10 has a strobe attached thereto. The camera 10, for example, a compact camera using 35 mm film, has a body case 12 which is substantially rectangular in form in a front elevational view.

The camera 10 is provided, on a front surface 12A of the body case 12, with a photographing lens 14 located substantially at a center of the front surface 12A in the longitudinal direction. A finder window 16 of a viewfinder is provided directly above and in the vicinity of the photographing lens 14. A shutter button 18 is provided on an upper surface of the body case 12 at a right end thereof as viewed from a photographer's side.

A strobe mounting arm 20 is pivoted at a base end thereof to the body case 12 at the upper right end of the front surface 12A. The strobe mounting arm 20 is rotatable or swingable within an angular range of around 180 degrees about the pivot connection. The rotating mechanism (pivot connection) which rotatably connects the strobe mounting arm 20 to the body case 12 can be realized for example by a pivot pin 24 or by two pairs of projections (shafts) and holes in which the corresponding projections are engaged, or can be by any other mechanism.

The strobe mounting arm 20 forms a casing of an electronic flash (strobe) equipment, which accommodates therein a strobe capacitor, 201 a charging circuit, 202 a trigger circuit 203 (not shown) etc. The strobe mounting arm (casing) 20 is provided on a front end thereof with a strobe light emitter (stroboscopic tube) 22.

A synchronization contact of the strobe is provided in the body case 12 and is connected to the trigger circuit within the strobe mounting arm 20 through a flexible printed circuit board (not shown).

The strobe mounting arm 20 is preferably hollow so as to be lightweight, while also being strong and rigid. In the case of a hollow arm, the internal space thereof can be effectively utilized, thus resulting in a realization of a lightweight and compact camera.

The axis of the pivot pin 24 of the strobe mounting arm 20 extends in an oblique direction with respect to the horizontal within a plane substantially perpendicular to an optical axis of the photographing lens 14. Namely, the axis of the pivot pin 24 is inclined downward toward the lower right direction as viewed from the photographer's side (i.e., upward toward the right direction in FIG. 1), so that a portion of the pivot pin 24 nearest to the photographing lens 14 is located higher than a portion of the pivot pin 24 adjacent to the lateral side edge of the body case 12 in a front elevational view.

The inclination angle of the pivot pin 24 with respect to the horizontal is approximately 45°. The strobe mounting arm 20 is comprised of a first arm portion 20A which extends in a direction substantially perpendicular to the pivot axis 24, and a second arm portion 20B which extends in a horizontal direction from the first arm portion 20A through a bent portion.

The strobe mounting arm 20 is rotatable about the pivot axis 24 through around 180°, to selectively occupy an inoperative position in which the strobe is not used, as indicated by a phantom line in FIGS. 1 and 2, and an operative position in which the strobe is used, as indicated by a solid line in FIGS. 1 and 2. Namely, when the strobe mounting arm 20 is rotated downward, the strobe is moved to a retracted position (inoperative position) and when it is rotated upward, the strobe is moved to a projected position (operative position).

When in the inoperative position, the strobe mounting arm 20 extends along the front surface 12A of the body case 12. In this position, the second arm portion 20B extends in the vertical direction, so that the front end of the strobe mounting arm 20 is located in the vicinity of the optical axis of the photographing lens 14.

When the strobe mounting arm 20 is in the operative position, the arm 20 projects substantially entirely from the upper right end, as viewed from the photographer's side, of the body case 12 at which the strobe mounting arm 20 is pivoted. In this position, the strobe mounting arm 20 lies in a plane substantially parallel to the front surface 12A of the body case 12 and the second arm portion 20B extends in the horizontal direction.

Note that a snap mechanism (for example, consisting of a pair of engaging projections and recesses) or a click mechanism may be provided to lock the strobe mounting arm 20 in the respective operative and inoperative positions.

The strobe light emitter 22 is provided on a front end of the second arm portion 20B, so that when the strobe mounting arm 20 is in the operative position, the strobe light emitter 22 faces toward the forward direction of the camera, i.e., faces toward a subject to be photographed. When the strobe mounting arm 20 is in the inoperative position, the strobe light emitter 22 faces toward the front surface 12A of the body case 12 and accordingly cannot be seen from the outside.

With this arrangement, not only can the strobe light emitter 22 be protected when no strobe is used, but also a camera having a good appearance can be provided.

As can be seen in FIG. 1, when the strobe mounting arm 20 is in the inoperative position, indicated by the phantom line, the entirety of the strobe mounting arm 20 is within the contour (generally rectangular shape) of the body case 12 in the front elevational view, and when the strobe mounting arm 20 is in the operative position indicated by the solid line, substantially the whole of the strobe mounting arm 20 projects from the body case 12.

Accordingly, upon strobe photographing, the optical axis of the photographing lens 14 is considerably far away from the optical axis of the strobe light emitter 22, in comparison with conventional compact cameras. Thus, it is possible to prevent the red-eye phenomenon from occurring when photographing a person using flash light. Furthermore, since the strobe mounting arm 20, having the strobe unit provided therein, is accommodated within the contour of the body case 12 when no strobe is used, the strobe mounting arm is not obstructive and thus, a compact camera can be realized.

The body case 12 is provided on the front surface 12A with a bulged or raised portion 26, at the right end of the camera body as viewed from the photographer's side, which constitutes a grip to be held by the photographer. The strobe mounting arm 20 is located between the bulged portion 26 and the photographing lens 14 when the strobe mounting arm 20 is in the inoperative position.

When the strobe mounting arm 20 is in the inoperative position, the outer surface (front surface) thereof facing forward is substantially flush or continuous with the outer surface (front surface) of the bulged portion 26. This arrangement contributes to a good appearance and an improved portability of the camera.

Figure 3:
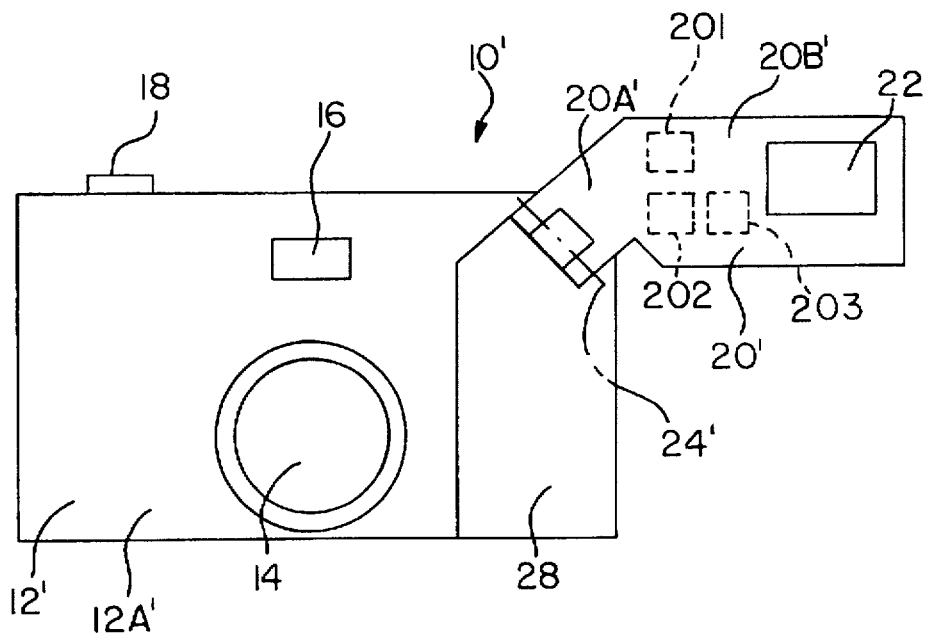
FIG. 3 is a front elevational view of a camera having electronic flash equipment, according to a second embodiment of the present invention; and, FIG. 4 is a perspective view of the camera shown in FIG. 3.

A second embodiment of the present invention will be discussed below, referring to FIGS. 3 and 4.

In the second embodiment, a strobe mounting arm 20' is pivoted at a base end thereof to a body case 12' of a camera 10' at a position laterally opposite to the pivotal connection position in the first embodiment. Namely, in the second embodiment, the strobe mounting arm 20' is rotatably connected to the body case 12' at an upper left corner of the body case 12', as viewed from the photographer's side.

A pivot axis (pivot pin) 24' extends in a direction inclined with respect to the horizontal within a plane substantially perpendicular to the optical axis of the photographing lens 14, similar to the first embodiment.

The axis of the pivot pin 24' is inclined downward toward the lower left direction as viewed from the photographer's side (i.e., upward toward the left direction in FIG. 3), so that a portion of the pivot pin 24' nearest to the photographing lens 14 is located higher than a portion of the pivot pin 24' adjacent to the lateral side edge of the body case 12' in a front elevational view.

The inclination angle of the pivot pin 24' with respect to the horizontal is approximately 45°, similar to the first embodiment. The strobe mounting arm 20' is comprised of a first arm portion 20'A which extends in a direction substantially perpendicular to the pivot axis 24', and a second arm portion 20'B which extends in a horizontal direction from the first arm portion 20'A through a bent portion.

Figure 4:
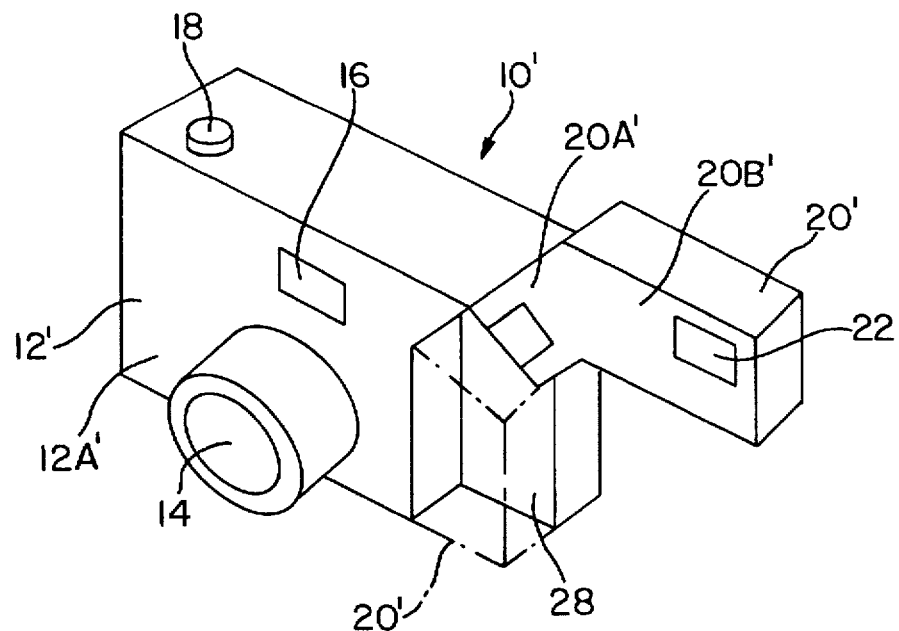

The strobe mounting arm 20' is rotatable about the pivot axis 24' through around 180° to selectively occupy an inoperative position in which the strobe is not used, as indicated by a phantom line in FIG. 4, and an operative position in which the strobe is used, as indicated by a solid line.

The body case 12' is provided on a front surface 12'A thereof with a recess 28 in which the strobe mounting arm 20' can be fitted when in the inoperative position.

When the strobe mounting arm 20' is in the inoperative position, the outer surface (front surface) thereof facing forward is substantially flush or continuous with the front surface 12'A of the body case 12.

The remaining structure and operation of the second embodiment is the same as that of the first embodiment. Therefore, the same technical effect as the first embodiment can be obtained in the second embodiment.

What is claimed is:

1. A camera having an electronic flash equipment, comprising:

a body case;

a photographing lens provided on a front surface of said body case proximate to a center of said front surface, said photographing lens having an optical axis, and horizontal and optical directions with respect to said optical axis being defined within a plane perpendicular to said optical axis;

a pivot connection including a pivot axis inclined with respect to said horizontal and vertical directions, a first end of said pivot axis being farther from said optical axis in said horizontal direction than a second end of said pivot axis, said first end being nearer said optical axis in said vertical direction than said second end;

a strobe mounting arm which is pivoted at a base end about said pivot axis with respect to an upper portion of said body case, said strobe mounting arm being swingable between a lower inoperative position in which said strobe mounting arm extends along said body case, and an upper operative position in which a portion of said strobe mounting arm projects outward from a lateral edge of said body case; and a strobe light emitter provided on said protecting portion of said strobe mounting arm, wherein when said strobe mounting arm is in said operative position, said strobe light emitter faces toward a subject to be photographed, and when said strobe mounting arm is in said inoperative position, said strobe light emitter faces away from a subject to be photographed.

2. The camera having an electronic flash equipment according to claim 1, further comprising a bulged grip portion provided at one end of said front surface of said body case, and wherein said strobe mounting arm is located between said photographing lens and said bulged grip portion when said strobe mounting arm is in said inoperative position.

3. The camera having an electronic flash equipment according to claim 2, wherein said bulged grip portion is provided with a front surface which is continuous with a front surface of said strobe mounting arm, when said strobe mounting arm is in said inoperative position.

4. The camera having an electronic flash equipment according to claim 1, wherein said body case is provided on said front surface thereof with a recess in which said strobe mounting arm is fitted when in said inoperative position.

5. The camera having an electronic flash equipment according to claim 4, wherein said front surface of said body case is flush with a front surface of said strobe mounting arm when said strobe mounting arm is in said inoperative position.

6. The camera having an electronic flash equipment according to claim 1, wherein a pivot axis, about which said strobe mounting arm is rotatable with respect to said body case, is inclined at an angle with respect to a horizontal within a plane perpendicular to an optical axis of said photographing lens, so that a portion of said pivot axis nearest to said photographing lens is higher than a portion of said pivot axis adjacent to a lateral end of said body case.

7. The camera having an electronic flash equipment according to claim 1, wherein said strobe mounting arm is entirely within a contour of said body case when said strobe mounting arm is in said inoperative position, in said front elevational view.

8. The camera having an electronic flash equipment according to claim 6, wherein said inclination angle of said pivot axis with respect to said horizontal is 45°.

9. The camera having an electronic flash equipment according to claim 1, wherein said strobe mounting arm is provided therein with a strobe capacitor, a charging circuit and a trigger circuit.

10. The camera according to claim 1, wherein said strobe mounting arm is swingable through 180 degrees between said lower inoperative position and said upper operative position.

11. A camera, comprising:

a body case;

a photographing lens provided on a front surface of said body case proximate to a center of said front surface, said photographing lens having an optical axis, horizontal and vertical directions with respect to said optical axis being defined within a plane perpendicular to said optical axis;

a pivot connection provided on an upper side portion of said body case, said pivot connection including a pivot axis inclined with respect to said horizontal and vertical directions, a first end of said pivot axis being farther from said optical axis in said horizontal direction than a second end of said pivot axis and nearer said optical axis in said vertical direction than said second end; and a strobe mounting arm pivoted at a base end to said pivot connection and having a strobe light emitter at a free end, said strobe mounting arm being movable between an inoperative position, in which said strobe mounting arm is entirely within a contour of said body case in a front elevational view, and an operative position, in which said strobe mounting arm projects outwardly from said body case.

12. The camera according to claim 11, wherein said pivot connection is angled, such that said strobe light emitter is displaced in two directions perpendicular to each other and to said optical axis, when said strobe mounting arm is moved between said inoperative position and said operative position.

13. The camera according to claim 11, wherein said pivot connection comprises a hinge, said hinge comprising a center hinge portion formed in said front surface of said body case and two outer hinge portions formed in said strobe mounting arm.

* * * * *